(12) United States Patent
Shiba (10) Patent No.: US 10,901,083 B2
(45) Date of Patent: Jan. 26, 2021

(54) TARGET SEARCH SYSTEM, METHOD, AND PROGRAM

(71) Applicant: NEC Corporation, Tokyo (JP)

(72) Inventor: Hisashi Shiba, Tokyo (JP)

(73) Assignee: NEC CORPORATION, Tokyo (JP)

(*) Notice: Subject to any disclaimer, the term of this patent is extended or adjusted under 35 U.S.C. 154(b) by 323 days.

(21) Appl. No.: 16/085,651

(22) PCT Filed: Mar. 24, 2017

(86) PCT No.: PCT/JP2017/012000
§ 371 (c)(1),
(2) Date: Sep. 17, 2018

(87) PCT Pub. No.: WO2017/164365
PCT Pub. Date: Sep. 28, 2017

(65) Prior Publication Data
US 2019/0033445 A1     Jan. 31, 2019

(30) Foreign Application Priority Data
Mar. 24, 2016   (JP) ................... 2016-059624

(51) Int. Cl.
*G01S 15/10*     (2006.01)
*G01S 15/32*     (2006.01)
(Continued)

(52) U.S. Cl.
CPC ............ *G01S 15/104* (2013.01); *G01S 7/282* (2013.01); *G01S 7/524* (2013.01); *G01S 13/26* (2013.01);
(Continued)

(58) Field of Classification Search
CPC ........ G01S 15/104; G01S 7/524; G01S 13/26; G01S 7/282; G01S 15/107; G01S 15/32; G01S 15/878
See application file for complete search history.

(56) References Cited

U.S. PATENT DOCUMENTS 6,078,281 A      6/2000   Milkovich et al.
10,761,185 B2 *  9/2020   Shiba ...................... G01S 7/292
(Continued)

FOREIGN PATENT DOCUMENTS

JP    11-194166 A    7/1999
JP    2000-304859 A  11/2000
(Continued)

OTHER PUBLICATIONS

Shiba, "Fundamentals of Active Sonar Signal Processing", The Journal of the Marine Acoustics Society of Japan, vol. 40, No. 3, Jul. 1, 2013, pp. 241-247.
(Continued)

*Primary Examiner* — Daniel Pihulic (57) ABSTRACT

A target search system includes: a signal processing unit that is input with a received signal including a reflected wave based on a pulsed transmission wave modulated in linear frequency modulation, calculates mutual correlation between the transmission wave and the received signal, and amplifies a power ratio of a signal component of a reflected wave from a target and another signal component at a predetermined process gain; a specifying unit by which a user specifies one value of a pulse length, a frequency change ratio, and a frequency amplitude of the transmission wave and the process gain; and a transmission wave determination unit that determines a remaining value of the transmission wave based on the specified one value of the pulse length, the frequency change ratio, and the frequency
(Continued)

amplitude of the transmission wave and the specified process gain so as to satisfy a relational equation for the process gain.

5 Claims, 7 Drawing Sheets

(51) Int. Cl.
- *G01S 15/87* (2006.01)
- *G01S 7/524* (2006.01)
- *G01S 13/26* (2006.01)
- *G01S 7/282* (2006.01)

(52) U.S. Cl.
CPC ............ *G01S 15/107* (2013.01); *G01S 15/32* (2013.01); *G01S 15/878* (2013.01)

(56) References Cited

U.S. PATENT DOCUMENTS

| | | |
|---|---|---|
| 2011/0156945 A1 | 6/2011 | Miyake et al. |
| 2012/0105270 A1 | 5/2012 | Miyake et al. |
| 2017/0184712 A1* | 6/2017 | Shiba ................ G01S 15/88 |
| 2018/0024227 A1* | 1/2018 | Shiba ................ G01S 7/536 |
| | | 342/175 |
| 2019/0033445 A1* | 1/2019 | Shiba ................ G01S 7/282 |

FOREIGN PATENT DOCUMENTS

| | | | | |
|---|---|---|---|---|
| JP | 2008-232861 A | 10/2008 | | |
| JP | 2010-197241 A | 9/2010 | | |
| JP | 2011-133404 A | 7/2011 | | |
| JP | 2011-133406 A | 7/2011 | | |
| JP | 6610977 B2 * | 11/2019 | ........... | G01S 15/107 |
| WO | WO-2017164365 A1 * | 9/2017 | ........... | G01S 15/104 |

OTHER PUBLICATIONS

Shiba, "Process Gain of Replica Correlation under Reverberation Dominant Environment", Proceedings of the Meeting of the Marine Acoustics Society of Japan 2016, May 17, 2016, pp. 15-18.

International Search Report dated Jun. 20, 2017 in counterpart international application No. PCT/JP2017/012000.

* cited by examiner

TARGET SEARCH SYSTEM, METHOD, AND PROGRAM

This application is a National Stage Entry of PCT/JP2017/012000 filed on Mar. 24, 2017, which claims priority from Japanese Patent Application 2016-059624 filed on Mar. 24, 2016, the contents of all of which are incorporated herein by reference, in their entirety.

TECHNICAL FIELD

The present invention relates to a target search system, a target search method, and a target search program and, in particular, relates to a target search system, a target search method, and a target search program that transmit a radio wave, an acoustic wave, a light wave, or the like and search for a target by using a reflected wave from the target.

BACKGROUND ART

A radar, a sonar, a rider, and the like are known as a system that transmits a radio wave, an acoustic wave, a light wave, or the like to search for a target by using a reflected wave from the target. These search systems transmit a modulated signal wave and calculate mutual correlation between a signal having the same waveform as the transmitted signal (replica signal) and a received signal. It is then determined whether or not the target is present according to a strength magnitude of mutual correlation. This mutual correlation is referred to as pulse compression, replica correlation, or the like. A use of replica correlation can be improved, a power ratio of a reflected wave from the target to noise, that is, an S/N ratio. A process gain due to replica correlation is important in projecting a performance such as a searchable distance of a search system.

A signal received by a search system includes a reflected wave from objects other than the target in addition to a reflected wave and a noise from the target. A reflected wave from objects other than the target means a clatter in a radar, reverberations in a sonar, or the like. A clatter in a radar is a reflected wave from the ground, a sea surface, or the like, and reverberations in a sonar mainly may include volume reverberations that are reverberations of sea water, sea surface reverberations that are reverberations from a sea surface, and sea floor reverberations that are reverberations from a sea bottom. When a reflected wave from objects other than the target is dominant, the performance of a search system depends on a process gain of a power ratio (S/R ratio) of a reflected wave from the target to the reflected wave from objects other than the target.

Patent Literature 1 discloses an active sonar device using a Linear Frequency Modulation (LFM) signal. The active sonar device of Patent Literature 1 transmits an LFM signal and improves the S/N ratio of a received signal by using a replica correlation process. Further, Patent Literature 2 discloses a signal processing device that improves the S/N ratio by using coherent integration. The signal processing device of Patent Literature 2 outputs an integrated output that satisfies a required process gain by determining the number of times of coherent integration based on the required process gain.

CITATION LIST

Patent Literature

PTL 1: Japanese Patent Application Laid-Open No. 2008-232861

PTL 2: Japanese Patent Application Laid-Open No. 2011-133404

SUMMARY OF INVENTION

Technical Problem

The inventions of Patent Literature 1 and Patent Literature 2 can improve the S/N ratio by using signal processing such as replica correlation. When a reflected wave from objects other than a target such as a clatter, reverberations, or the like has much influence, however, the process gain obtained by signal processing is deteriorated. No specific relational expression has been known so far for the process gain of a power ratio (S/R ratio) of a reflected wave from a target to a reflected wave from objects other than the target. Thus, a user is required to determine a transmission waveform which provides a good S/R ratio by trial and error relying on the brightness or the like of a target displayed on a screen, for example.

The present invention has been made in view of the above problem and intends to provide a target search system, a target search method, and a target search program that can obtain a desired process gain when there is influence by a reflected wave from objects other than a target.

Solution to Problem

A target search system according to the present invention includes: a signal processing unit that is input with a received signal including a reflected wave based on a pulsed transmission wave modulated in linear frequency modulation, calculates mutual correlation between the transmission wave and the received signal, and amplifies a power ratio of a signal component of a reflected wave from a target and another signal component at a predetermined process gain; a specifying unit by which a user specifies one value of a pulse length, a frequency change ratio, and a frequency amplitude of the transmission wave and the process gain; and a transmission wave determination unit that determines a remaining value of the transmission wave based on the specified one value of the pulse length, the frequency change ratio, and the frequency amplitude of the transmission wave and the specified process gain so as to satisfy

[Math. 1]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

A target search method according to the present invention includes steps of: inputting a received signal including a reflected wave based on a pulsed transmission wave modulated in linear frequency modulation; calculating mutual correlation between the transmission wave and the received signal and amplifying a power ratio of a signal component of a reflected wave from a target and another signal component at a predetermined process gain; acquiring one value of a pulse length, a frequency change ratio, and a frequency amplitude of the transmission wave and the process gain from a user; and determining a remaining value of the transmission wave based on the specified one value of the pulse length, the frequency change ratio, and the frequency amplitude of the transmission wave and the specified process gain so as to satisfy

[Math. 2]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

A target search program according to the present invention causes a computer to execute steps of: inputting a received signal including a reflected wave based on a pulsed transmission wave modulated in linear frequency modulation; calculating mutual correlation between the transmission wave and the received signal and amplifying a power ratio of a signal component of a reflected wave from a target and another signal component at a predetermined process gain; acquiring one value of a pulse length, a frequency change ratio, and a frequency amplitude of the transmission wave and the process gain from a user; and determining a remaining value of the transmission wave based on the specified one value of the pulse length, the frequency change ratio, and the frequency amplitude of the transmission wave and the specified process gain so as to satisfy

[Math. 3]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

Advantageous Effects of Invention

According to the present invention, an appropriate transmission waveform can be determined based on a relational expression for a process gain of a power ratio (S/R ratio) of a reflected wave from a target to a reflected wave from objects other than the target. This can realize a target search system, a target search method, and a target search program that can obtain a desired process gain when there is influence by a reflected wave from objects other than a target.

DESCRIPTION OF EMBODIMENTS

The example embodiments of the present invention will be described below with reference to the drawings.

First Example Embodiment

Figure 1:
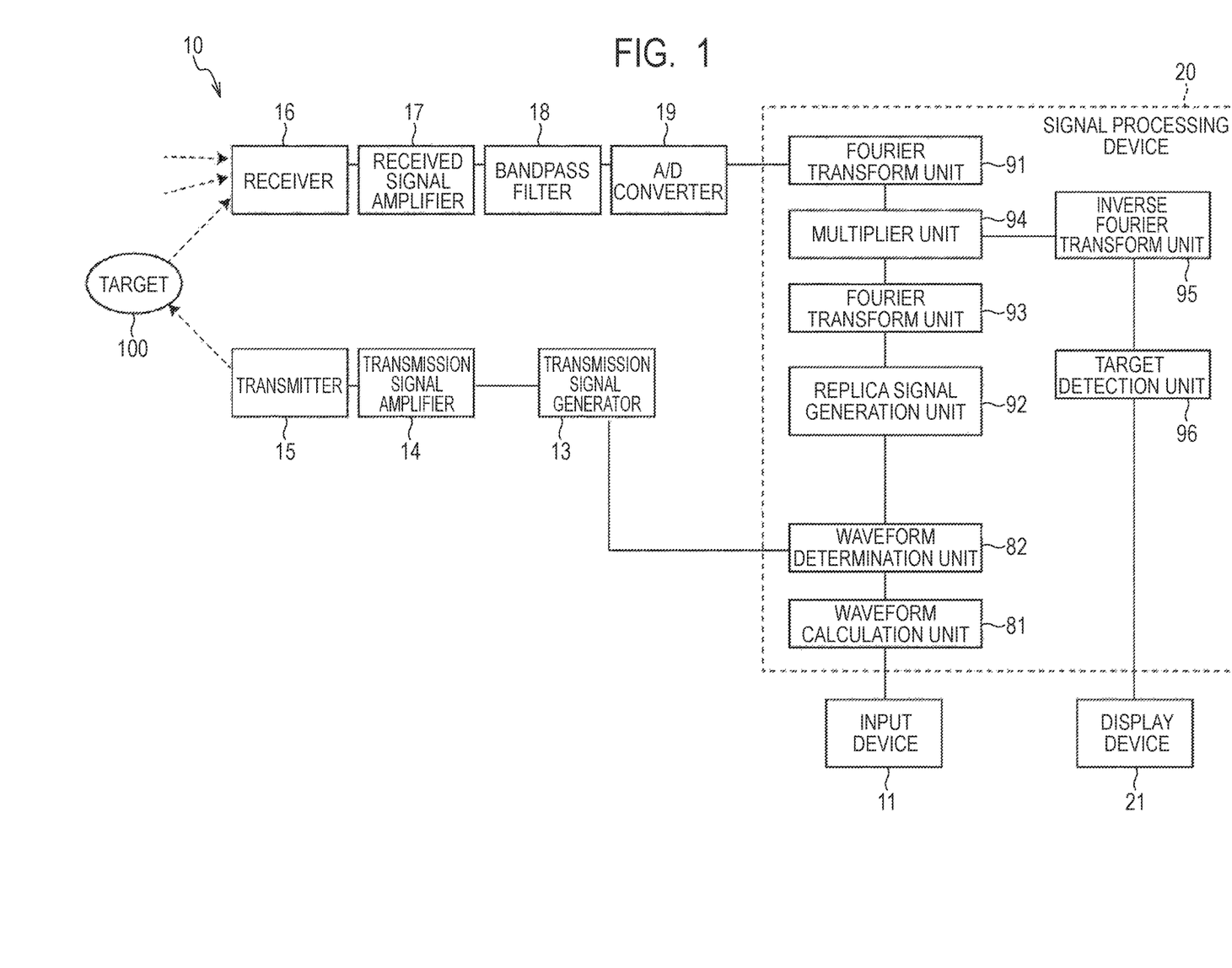
FIG. 1 is a block diagram illustrating a configuration of a target search system according to a first example embodiment of the present invention.

FIG. 1 is a block diagram illustrating a configuration of a target search system 10 according to the present example embodiment. The target search system 10 has an input device 11, a transmission signal generator 13, a transmission signal amplifier 14, a transmitter 15, a receiver 16, a received signal amplifier 17, a bandpass filter 18, an analog-to-digital (A/D) converter 19, a signal processing device 20, and a display device 21. The signal processing device 20 has a waveform calculation unit 81, a waveform determination unit 82, a Fourier transform unit 91, a replica signal generation unit 92, a Fourier transform unit 93, a multiplier unit 94, an inverse Fourier transform unit 95, and a target detection unit 96. The waveform calculation unit 81 and the waveform determination unit 82 may be referred to as a transmission wave determination unit. The Fourier transform unit 91, the replica signal generation unit 92, the Fourier transform unit 93, the multiplier unit 94, and the inverse Fourier transform unit 95 may be referred to as a signal processing unit. The target search system 10 is, for example, an active sonar and can obtain information (presence, location, feature, or the like) on a target 100 in the sea. The target search system 100 transmits a pulsed LFM signal and improves the Signal to Reverberation ratio (S/R ratio), which is a ratio of a received reflected wave signal to reverberations, by using a replica correlation process. Here, the S/R ratio is a power ratio of a reflected wave from a target to a reflected wave from objects other than the target. The replica correlation process is a process of calculating mutual correlation of a transmitted wave to a received reflected wave.

The input device 11 is formed of a device for entry, such as a keyboard, a mouse, or the like, for example. The input device 11 may be referred to as a specifying unit. The display device 21 is formed of a liquid crystal display, an organic light emitting device, or the like and can display an entry window used for specifying a transmission signal and signal processing in addition to display an image obtained from a reflected wave. The user may perform designation of a transmission signal or various setting of signal processing by operating the input device 11 while viewing the display device 21. That is, the user can specify at least one value of a pulse length $T_0$, a frequency change ratio $\mu$, and a frequency amplitude $\Delta f$ of an LFM signal and a process gain PG. For example, the process gain PG may be specified by the user inputting a numeric value by using a keyboard in an entry window on the display device 21. An S/R ratio before or after a replica correlation process, a logarithm of an S/R ratio, or a multiplication value of a logarithm of an S/R ratio and a certain numeric value may be specified as a process gain PG. Note that, while an S/N ratio before or after various processes including processes other than a replica correlation process may be referred to as a process gain, in the present specification, the S/R ratio before or after a replica correlation process is referred to as a process gain.

The pulse length $T_0$, the frequency change ratio $\mu$, and the frequency amplitude $\Delta f$ of an LFM signal can be specified by inputting numeric values in an entry window on the display device 21 by using a keyboard or editing a waveform diagram of the display device 21 by using a mouse. That is, the user can specify a value of a desired process gain PG and one value of the pulse length $T_0$, the frequency change ratio $\mu$, and the frequency amplitude $\Delta f$ of a transmission wave by using the input device 11 as parameters for determining a transmission waveform. Here, a frequency amplitude $\Delta f$ may be represented by a multiplication value of a pulse length $T_0$ and a frequency change ratio $\mu$.

The waveform calculation unit 81 determines the remaining value(s) of a transmission value based on one value of the pulse length $T_0$, the frequency change ratio $\mu$, and the frequency amplitude $\Delta f$ of a transmission wave as well as the specified process gain PG. For example, the waveform calculation unit 81 calculates a frequency change ratio $\mu$ or a frequency amplitude $\Delta f$ from the process gain PG and the pulse length $T_0$. Further, when a frequency change ratio $\mu$ instead of a pulse length $T_0$ is specified by the input device 11, the waveform calculation unit 81 calculates a pulse length $T_0$ or a frequency amplitude $\Delta f$ from the specified process gain PG and the frequency change ratio $\mu$. Furthermore, when a frequency amplitude $\Delta f$ instead of a pulse length $T_0$ is specified by the input device 11, the waveform calculation unit 81 calculates a pulse length $T_0$ or a frequency change ratio $\mu$ from the specified process gain PG and the frequency amplitude $\Delta f$. The relational equation used in the waveform calculation unit 81 will be described later.

The waveform determination unit 82 determines a transmission waveform based on the pulse length $T_0$, the frequency change ratio $\mu$, or the frequency amplitude $\Delta f$ specified by the input device 11 or calculated by the waveform calculation unit 81 and outputs data of the transmission waveform to the transmission signal generator 13. Data of a transmission waveform is a combination of the pulse length $T_0$, the frequency change ratio $\mu$, and the frequency amplitude $\Delta f$, for example, and includes information that is necessary for the transmission signal generator 13 to generate a transmission signal. Further, the waveform determination unit 82 outputs, to the replica signal generation unit 92, waveform data of a signal that is output to the transmission signal generator 13.

The transmission signal generator 13 includes a digital-to-analog converter circuit and is able to generate a transmission signal with any waveform. The transmission signal generator 13 generates a transmission signal of a transmission waveform determined by the waveform determination unit 82 and outputs it to the transmission signal amplifier 14. The transmission signal amplifier 14 amplifies the power of the input signal and outputs the amplified signal to the transmitter 15. The transmitter 15 is formed of a piezoelectric oscillator made of ceramics or the like and converts a transmission signal to an acoustic signal (acoustic wave) to emit the acoustic wave in the sea. In order to make the directivity of the transmitter 15 sharper, a plurality of transmitters may be aligned in an array.

The receiver 16 is formed of a piezoelectric oscillator made of ceramics, for example, and receives an acoustic signal (acoustic wave) in the sea. The acoustic signal received by the receiver 16 includes a reflected wave from the target 100 and a reflected wave and noise from objects other than the target 100. The receiver 16 converts a received acoustic signal to an electric signal and outputs the electric signal to the received signal amplifier 17. In order to make the directivity of the receiver 16 sharper, a plurality of receivers may be aligned in an array. The received signal amplifier 17 amplifies an input signal and outputs the amplified signal to the bandpass filter 18. The bandpass filter 18 is formed of a bandpass filter and filters a frequency band including a reflected wave for output to the A/D converter 19. The A/D converter 19 converts the input analog signal to a digital signal and outputs the digital signal to the Fourier transform unit 91 of the signal processing device 20 as a received signal.

The Fourier transform unit 91 performs Fourier transform on the received signal and outputs the resultant signal to the multiplier unit 94. The replica signal generation unit 92 generates a signal (replica signal) that is a sample of a transmission signal based on waveform data from the waveform determination unit 82 and outputs the generated signal to the Fourier transform unit 93. The Fourier transform unit 93 performs Fourier transform on the replica signal and outputs the resultant signal to the multiplier unit 94. The multiplier unit 94 multiplies the received signal resulted by Fourier transform and a complex conjugate of the replica signal and outputs the product to the inverse Fourier transform unit 95. The inverse Fourier transform unit 95 performs inverse Fourier transform on the product from the multiplier unit 94. In such a way, mutual correlation between a transmission wave and a received reflected wave is calculated.

The target detection unit 96 detects a target based on a strength (correlation degree) of the calculated mutual correlation. For example, the target detection unit 96 determines that the target is present when the correlation degree is greater than a predetermined threshold and calculates the position of the target based on the arrival time, direction, or the like of the reflected wave. The target detection unit stores a detection result in a not-shown storage device and outputs it to the display device 21. The display device 21 can display the position of the target 100 in polar coordinates about the receiver 16 as the center. The position of the target 100 may be displayed using coordinates whose horizontal axis represents the orientation and vertical axis represents the distance.

Figure 2:
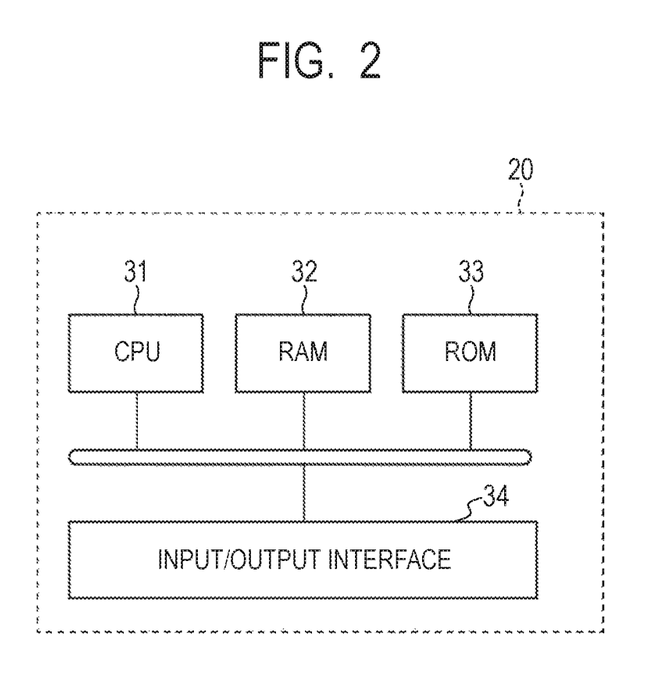
FIG. 2 is a block diagram illustrating a configuration of a signal processing device according to the first example embodiment of the present invention.

FIG. 2 is a block diagram illustrating a configuration of the signal processing device 20 according to the present example embodiment. The signal processing device 20 is formed of a personal computer, a microcomputer, or the like and has a central processing unit (CPU) 31, a random access memory (RAM) 32, a read only memory (ROM) 33, and an input/output interface 34. The signal processing device 20 may be formed of a plurality of computers.

The CPU 31 implements the functions of respective units of the signal processing device 20 by reading a predetermined program from the ROM 33 and executing it. Further, the CPU 31 stores data obtained by a process in the ROM 33 and externally exchanges data via the input/output interface 34. The RAM 32 is used as work memory of a program executed by the CPU 31 and temporarily stores data being processed, data read from the ROM 33, or the like. The ROM 33 stores programs used for implementing the functions of respective units of the signal processing device 20, such as a program used for determining a transmission waveform, a program used for performing the replica correlation process, a program used for performing the target detection process, or the like.

Figure 3:
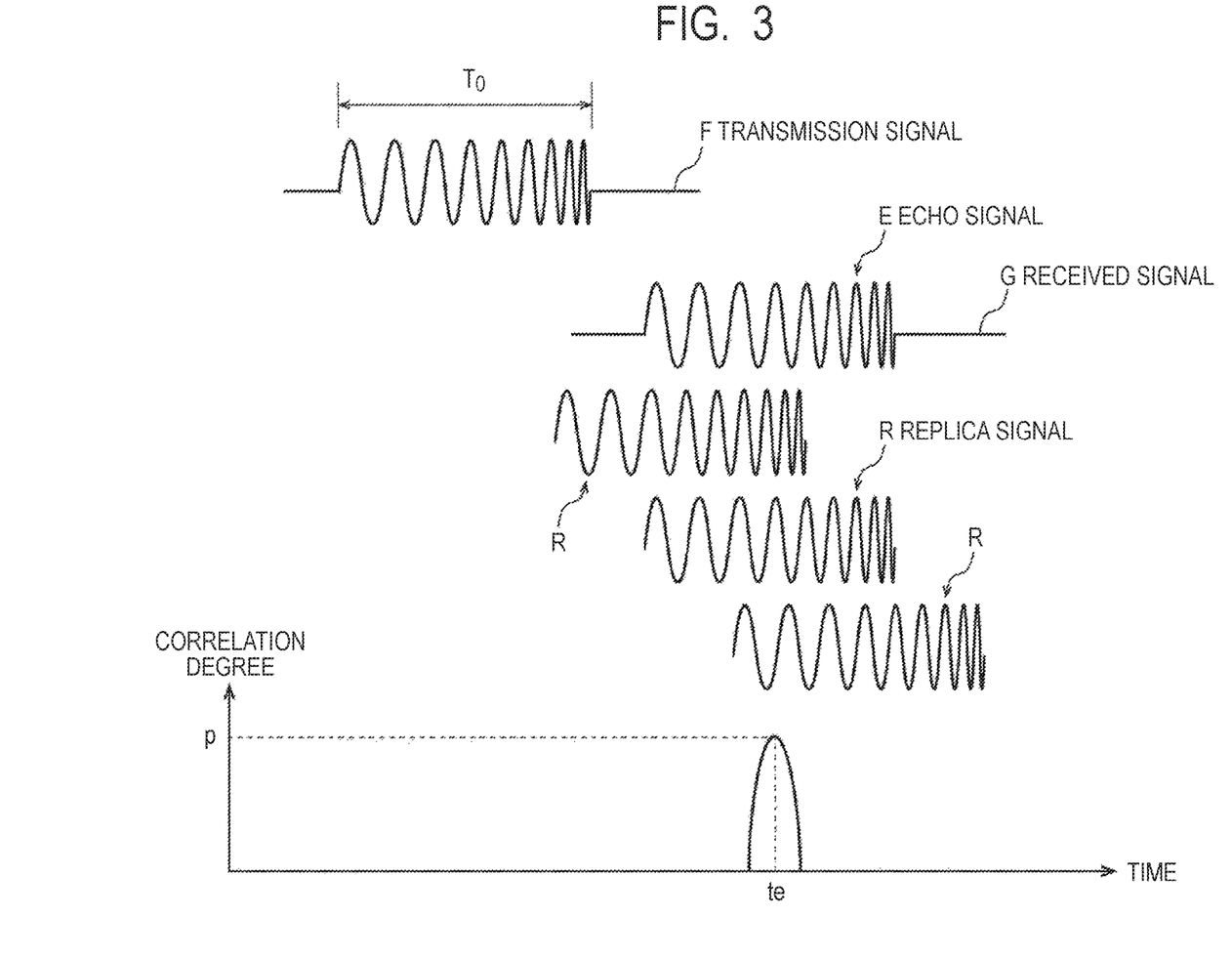
FIG. 3 is a conceptual diagram illustrating the principle of target detection by using a replica correlation process.

FIG. 3 is a conceptual diagram illustrating the principle of target detection by a replica correlation process. A replica correlation process is signal processing to calculate the correlation degree between a received signal and a replica signal while shifting time with respect to the received signal.

A transmission signal F is a signal wave with a pulse length $T_0$ transmitted from the transmitter 15 and is modulated so that the frequency changes within the pulse. A received signal G is a signal wave received by the receiver 16 and includes an echo signal E that is a reflected wave from the target 100. The replica signal R is a sample signal generated by the replica signal generation unit 92 and has the same waveform as the transmission signal F. Note that the received signal G may include a noise component having no correlation with the transmission signal F other than the echo signal E.

As illustrated in FIG. 3, mutual correlation (correlation degree) to the replica signal R is calculated while the time is shifted with respect to the received signal G, and thereby a peak p of the correlation degree appears at the time te when two waveforms are the most similar to each other. The signal processing device 20 determines that the echo signal E reaches the time te and calculates the distance to the target 100 based on a delay time of the echo signal E with respect to the transmission signal F.

[Relational Equation for Process Gain]

Next, a relational equation used in the waveform calculation unit 81 will be described.

The inventers have found that the following equation is derived, where the process gain is denoted as PG, the pulse length is denoted as $T_0$ (second), and the frequency change ratio is denoted as μ (Hz/second).

[Math. 4]

$$PG = T_0\sqrt{\frac{|\mu|}{2\pi}} \qquad \text{Equation (1)}$$

In Equation (1), since the frequency change ratio μ is represented by an absolute value, the process gain PG does not depend on the sign of the frequency change ratio μ. Further, since the frequency change ratio μ is represented as $\Delta f = T_0 \times \mu$ by using the frequency amplitude Δf and the pulse length $T_0$, Equation (1) can be rewritten to the following Equation (2).

[Math. 5]

$$PG = \sqrt{\frac{T_0|\Delta f|}{2\pi}} \qquad \text{Equation (2)}$$

When one of the pulse length $T_0$, the frequency change ratio μ, and the frequency amplitude Δf as well as the process gain PG are specified, the waveform calculation unit 81 calculates the remaining value(s), which has not yet been specified, of the pulse length $T_0$, the frequency change ratio μ, and the frequency amplitude Δf based on Equation (1) or Equation (2).

Next, the reason why Equation (1) and Equation (2) are obtained will be described with an example of a case of a sonar transmitting an LFM signal. Note that, in the case of a sonar, reflected waves from objects other than the target 100 correspond to reverberations. In the following description, an input signal x(t) corresponds to a signal input to the signal processing device 20 from the A/D converter 19, and a target signal component s(t) and a reverberation component r(t) correspond to a reflected wave from the target 100 and a reflected wave from an object other than the target 100, respectively.

[Definition of Replica Correlation]

The input signal is represented as x(t)=s(t)+r(t), where the target signal component and a reverberation component in the input signal x(t) are denoted as s(t) and r(t), respectively. Assuming that the target signal component s(t) is from a point sound source, the replica signal y(t) and the target signal component s(t) are of the same form. For simplicity here, the intensities thereof are equal to each other, and the replica signal is defined as y(t)=s(t).

The replica correlation between the input signal x(t) and the replica signal y(t) are expressed by the following equation.

$$R_{xy}(\tau)=\int_{-\infty}^{\infty}x^*(t)y(t+\tau)dt=\int_{-\infty}^{\infty}s^*(t)s(t+\tau)dt+\int_{-\infty}^{\infty}r^*(t)s(t+\tau)dt \qquad \text{[Math. 6]}$$

The first item of the right side is a target signal component after replica correlation and is expressed by the following equation.

$$R_{ss}(\tau)=\int_{-\infty}^{\infty}s^*(t)s(t+\tau) \qquad \text{[Math. 7]}$$

The second item of the right side is a reverberation component after replica correlation and is expressed by the following equation.

$$R_{rs}(\tau)=\int_{-\infty}^{\infty}r^*(t)s(t+\tau)dt \qquad \text{[Math. 8]}$$

[Reverberation Model]

The reverberation is modeled as below assuming that it is an overlapped combination of signal components having different intensities from the transmission waveform but having the same form as the transmission waveform.

[Math. 9]

$$r(t)=\sum_{n=1}^{N}A_n s(t-t_n) \quad A_n, t_n \text{ are real numbers}$$

[Deviation of Reverberation Components Before Replica Correlation]

The deviation d of reverberation components before replica correlation is expressed by the following equation.

$$d=\langle |r(t)-\langle r(t)\rangle|^2\rangle=\langle |r(t)|^2\rangle-|\langle r(t)\rangle|^2 \qquad \text{[Math. 10]}$$

where < > means a time average.

The reverberation model described above clearly leads to <r(t)>=0, and the deviation d of reverberation components before replica correlation is expressed by the following equation.

$$d=\langle |r(t)|^2\rangle \qquad \text{[Math. 11]}$$

Since the reverberation is an overlapped combination of a finite length pulse and thus has a finite length, an integration for a finite time period is divided by the time length thereof for obtaining a time average.

The time average <f(t)> of a function f(t) is defined as below.

[Math. 12]

$$\langle f(t) \rangle = \frac{1}{T} \int_{-T/2}^{T/2} f(t) dt \qquad 5$$

where T>>pulse length $T_0$.

Then, the deviation d of reverberation components before replica correlation is expressed by the following equation.

[Math. 13]

$$d = \langle |r(t)|^2 \rangle =$$
$$\frac{1}{T} \int_{-T/2}^{T/2} |r(t)|^2 dt = \frac{1}{T} \int_{-T/2}^{T/2} \left\{ \sum_{n=1}^{N} A_n^* s^*(t - t_n) \right\} \left\{ \sum_{m=1}^{N} A_m s(t - t_m) \right\} dt =$$
$$\frac{1}{T} \sum_{n=1}^{N} \sum_{m=1}^{N} A_m A_n^* \int_{-T/2}^{T/2} s^*(t - t_n) s(t - t_m) dt$$

When provided that only the reverberations which fully fall in an integration range of $-T/2 \le \tau \le T/2$ are considered, the integration result does not change even when the integration range is $-\infty \le \tau \le \infty$. That is, the deviation d of reverberation components before replica correlation is expressed by the following equation.

[Math. 14]

$$d = \langle |r(t)|^2 \rangle = \frac{1}{T} \sum_{n=1}^{N} \sum_{m=1}^{N} A_m A_n^* \int_{-\infty}^{\infty} s^*(t - t_n) s(t - t_m) dt$$

When variable conversion of $t'=t-t_n$ is performed here, the deviation d of reverberation components before replica correlation is expressed by the following equation.

[Math. 15]

$$d = \langle |r(t')|^2 \rangle = \frac{1}{T} \sum_{n=1}^{N} \sum_{m=1}^{N} A_m A_n * \int_{-\infty}^{\infty} s*(t') s(t' + t_n - t_m) dt$$

[Deviation of Reverberation Components after Replica Correlation]

The deviation D of reverberation components after replica correlation is represented by the following equation.

$$D = \langle |R_{rs}(\tau) - \langle R_{rs}(\tau) \rangle|^2 \rangle = \langle |R_{rs}(\tau)|^2 \rangle - |\langle R_{rs}(\tau) \rangle|^2 \qquad \text{[Math. 16]}$$

Since the reverberation is an overlapped combination of a finite length pulse and thus has a finite length, an integration for a finite time period is divided by the time length thereof for obtaining a time average in a similar manner to the above.

The time average of reverberation components after replica correlation included in the second item of the right side in the above equation is expressed by the following equation.

[Math. 17]

$$\langle R_{rs}(\tau) \rangle = \frac{1}{T} \int_{-T/2}^{T/2} \left\{ \int_{-\infty}^{\infty} r*(t) s(t+\tau) dt \right\} d\tau$$

The following equation is established as a general relational equation of mutual correlation.

$$\int_{-\infty}^{\infty} r^*(t) s(t+\tau) dt = \int_{-\infty}^{\infty} s^*(t) r(t-\tau) dt \qquad \text{[Math. 18]}$$

With a use of this equation, the time average of reverberation components after replica correlation is expressed by the following equation.

[Math. 19]

$$\langle R_{rs}(\tau) \rangle = \int_{-\infty}^{\infty} s*(t) \left\{ \frac{1}{T} \int_{-T/2}^{T/2} r(t-\tau) d\tau \right\} dt$$

Application of the reverberation model described above allows for the following replacement.

[Math. 20]

$$\int_{-T/2}^{T/2} r(t-\tau) d\tau = \sum_{n=1}^{N} A_n \int_{-T/2}^{T/2} s(t - \tau - t_n) d\tau$$

If the pulse length $T_0$ fully falls in an interval of integration, the integration result in the right side of the above equation will be zero.

$$\int_{-T/2}^{T/2} s(t-\tau-t_n) d\tau = 0 \qquad \text{[Math. 21]}$$

That is, the following equation is established.

[Math. 22]

$$\sum_{n=1}^{N} A_n \int_{-T/2}^{T/2} s(t - \tau - t_n) d\tau = 0$$

Therefore, in a case of noise, the time average of reverberation components after replica correlation will be zero in a similar manner to the case before replica correlation.

$$\langle R_{rs}(\tau) \rangle = 0 \qquad \text{[Math. 23]}$$

Therefore, the deviation D of reverberation components after replica correlation is expressed by the following equation.

$$D = \langle |R_{rs}(\tau)|^2 \rangle \qquad \text{[Math. 24]}$$

Next, the following equation is calculated.

[Math. 25]

$$\langle |R_{rs}(\tau)|^2 \rangle = \frac{1}{T} \int_{-T/2}^{T/2} |R_{rs}(\tau)|^2 d\tau$$

With a use of reverberation model described above, the reverberation component after replica correlation is expressed by the following equation.

[Math. 26]

$$R_{rs}(\tau) = \int_{-\infty}^{\infty} r*(t)s(t+\tau)dt = \sum_{n=1}^{N} A_n * \int_{-\infty}^{\infty} s*(t-t_n)s(t+\tau)dt$$

With t'=t-tn, variable conversion is performed on the reverberation component after replica correlation as below.

[Math. 27]

$$R_{rs}(\tau) = \sum_{n=1}^{N} A_n * R_{ss}(t_n + \tau)$$

Therefore, the deviation D of the reverberation component after replica correlation is expressed by the following equation.

[Math. 28]

$$D = \langle |R_{rs}(\tau)|^2 \rangle = \frac{1}{T}\sum_{n=1}^{N}\sum_{m=1}^{N} A_m A_n * \int_{-T/2}^{T/2} R_{ss}(t_n+\tau)R_{ss}*(t_m+\tau)d\tau$$

When provided that only the reverberations which fully fall in an integration range of $-T/2 \leq \tau \leq T/2$ are considered, the integration result does not change even when the integration range is $-\infty \leq \tau \leq \infty$. That is, the deviation D of reverberation components after replica correlation is represented by the following equation, which is mutual correlation of replica correlation.

[Math. 29]

$$D = \langle |R_{rs}(\tau)|^2 \rangle = \frac{1}{T}\sum_{n=1}^{N}\sum_{m=1}^{N} A_m A_n * \int_{-\infty}^{\infty} R_{ss}(t_n+\tau)R_{ss}*(t_m+\tau)d\tau$$

[Case of LFM Signal]

The above cases described so far do not depend on a signal waveform. A case of an LFM signal will be now described.

An LFM signal is defined as below.

[Math. 30]

$$s(t) = \begin{cases} B\exp\left(j\omega t + \frac{j\mu t^2}{2}\right) & |t| \leq \frac{T_0}{2} \\ 0 & \text{otherwise} \end{cases}$$

Then, replica correlation to the LFM signal itself will be as below.

[Math. 31]

$$R_{ss}(\tau) = \begin{cases} \frac{2|B|^2}{\mu\tau}\exp(j\omega\tau)\sin\left\{\frac{\mu\tau}{2}(T_0-\tau)\right\} & 0 < \tau \leq T_0 \\ |B|^2 T_0 & \tau = 0 \\ \frac{2|B|^2}{\mu\tau}\exp(j\omega\tau)\sin\left\{\frac{\mu\tau}{2}(T_0+\tau)\right\} & -T_0 \leq \tau < 0 \\ 0 & \tau < -T_0 \text{ or } \tau > T_0 \end{cases}$$

In a situation where |μ| is large, the degree of concentration to τ=0 is high, and the feature of a replica correlation can be found only near τ=0. From this consideration, when it is assumed that only the range of $|\tau| \ll T_0$ may be considered, the replica correlation can be approximated as below.

[Math. 32]

$$(\tau) = \begin{cases} |B|^2 T_0 \exp(j\omega\tau)\text{sinc}\left(\frac{\mu T_0 \tau}{2}\right) & -T_0 \leq \tau \leq T_0 \\ 0 & \tau < -T_0 \text{ or } \tau > T_0 \end{cases}$$

[Deviation of Reverberation Component Before Replica Correlation for LFM Signal]

The deviation d of reverberation components before replica correlation resulted by approximation is expressed by the following equation.

[Math. 33]

$$d = \langle |r(t')|^2 \rangle =$$
$$\frac{1}{T}\sum_{n=1}^{N}\sum_{m=1}^{N} A_m A_n * |B|^2 T_0 \exp\{j\omega(t_n - t_m)\}\text{sinc}\left\{\frac{\mu T_0(t_n - t_m)}{2}\right\}$$

[Deviation of Reverberation Component after Replica Correlation for LFM Signal]

The deviation D of reverberation components after replica correlation is calculated by using the above approximation.

[Math. 34]

$$D = \langle |R_{rs}(\tau)|^2 \rangle = \frac{1}{T}\sum_{n=1}^{N}\sum_{m=1}^{N} A_m A_n * \int_{-\infty}^{\infty} R_{ss}(t_n+\tau)R_{ss}*(t_m+\tau)d\tau$$

The next integration is calculated.

[Math. 35]

$$\int_{-\infty}^{\infty} R_{ss}(t_n+\tau)R_{ss}^*(t_m+\tau)d\tau =$$
$$|B|^4 T_0^2 \exp\{j\omega(t_n - t_m)\}\int_{-\infty}^{\infty}\text{sinc}\left\{\frac{\mu T_0}{2}(t_n+\tau)\right\}\text{sinc}\left\{\frac{\mu T_0}{2}(t_m+\tau)\right\}d\tau$$

The following formula is used here.

$$\int_{-\infty}^{\infty} \text{sinc}(x+a)\text{sinc}(x+b)dx = \pi\,\text{sinc}(b-a) \qquad \text{[Math. 36]}$$

Variable conversion is performed taking the case of μ<0 into consideration, and thereby the following equation is obtained.

[Math. 37]

$$\int_{-\infty}^{\infty} \operatorname{sinc}\left\{\frac{\mu T_0}{2}(t_n + \tau)\right\} \operatorname{sinc}\left\{\frac{\mu T_0}{2}(t_m + \tau)\right\} d\tau = \frac{2\pi}{|\mu|T_0} \operatorname{sinc}\left\{\frac{\mu T_0}{2}(t_m - t_n)\right\}$$

Therefore, the above integration result is expressed by the following equation.

[Math. 38]

$$\int_{-\infty}^{\infty} R_{ss}(t_n + \tau) R_{ss}^*(t_m + \tau) d\tau =$$

$$\frac{2\pi |B|^4 T_0}{|\mu|} \exp\{j\omega(t_n - t_m)\} \operatorname{sinc}\left\{\frac{\mu T_0}{2}(t_m - t_n)\right\}$$

Therefore, the deviation D of reverberation components after replica correlation is expressed by the following equation.

[Math. 39]

$$D =$$

$$\langle |R_{rs}(\tau)|^2 \rangle = \frac{2\pi |B|^4 T_0}{|\mu|T} \sum_{n=1}^{N} \sum_{m=1}^{N} A_m A_n^* \exp\{j\omega(t_n - t_m)\} \operatorname{sinc}\left\{\frac{\mu T_0}{2}(t_m - t_n)\right\}$$

[Process Gain]

The ratio of deviations of reverberation components before and after replica correlation is expressed by the following equation.

[Math. 40]

$$\frac{D}{d} = \frac{2\pi |B|^2}{|\mu|}$$

Therefore, the ratio of standard deviations of reverberation components before or after replica correlation is expressed by the following equation.

[Math. 41]

$$\sqrt{\frac{D}{d}} = |B| \sqrt{\frac{2\pi}{|\mu|}}$$

The ratio of components of target echo is expressed by the following equation.

[Math. 42]

$$\frac{R_{ss}(0)}{|B|} = |B| T_0$$

Since the signal to reverberation ratio (S/R ratio) is a ratio of the target echo and the standard deviation of the reverberation components, the process gain PG of the S/R ratio is expressed by the following equation.

[Math. 43]

$$PG = \frac{R_{ss}(0)/\sqrt{D}}{|B|/\sqrt{d}} = T_0 \sqrt{\frac{|\mu|}{2\pi}}$$

As discussed above, Equation (1) is obtained.

Figure 4:
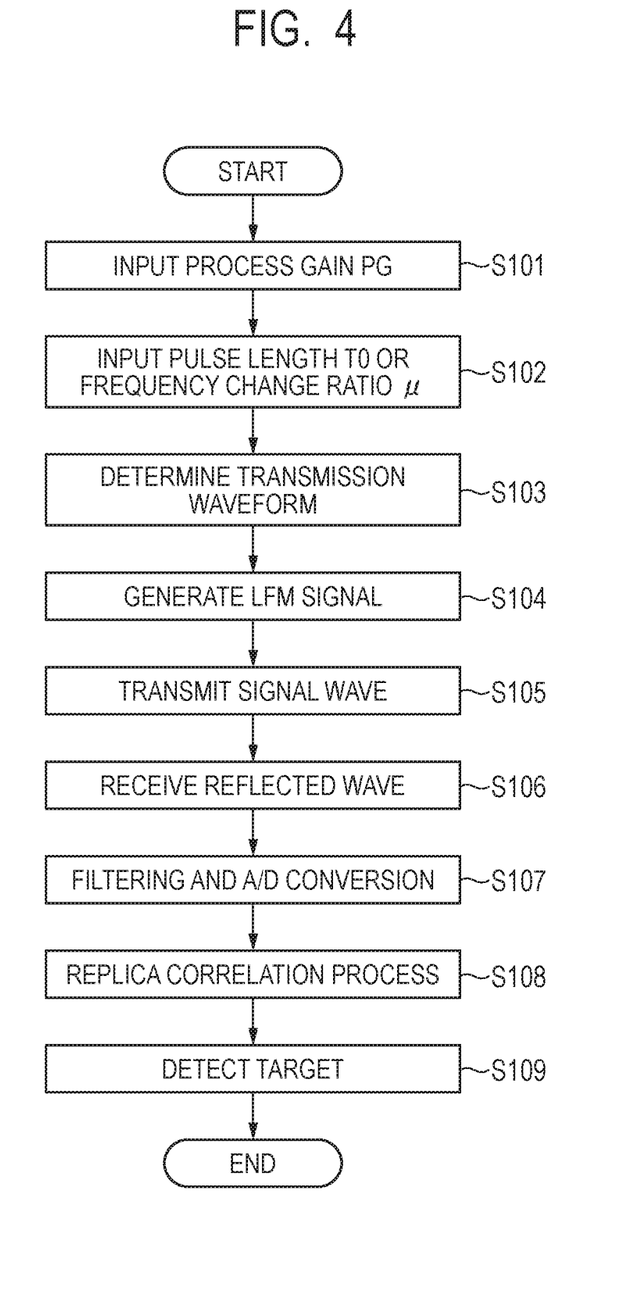
FIG. 4 is a flowchart illustrating a process of a target search system according to the first example embodiment of the present invention.

FIG. 4 is a flowchart illustrating a process of a target search system 10 according to the present example embodiment. First, the input device 11 inputs a process gain PG specified by the user in the waveform calculation unit 81 (step S101). Furthermore, the input device 11 inputs a pulse length $T_0$ or a frequency change ratio μ specified by the user to the waveform calculation unit 81 (step S102). The process order of these steps S101 and S102 may be opposite.

Next, the waveform calculation unit 81 and the waveform determination unit 82 determine a waveform of a transmission wave based on user designation (step S103). Specifically, first, the waveform calculation unit 81 calculates the remaining value(s), which has not been specified, of the pulse length $T_0$ or the frequency change ratio μ so as to satisfy Equation (1) described above. That is, the waveform calculation unit 81 calculates the frequency change ratio μ when the pulse length $T_0$ is specified by the user. In this case, the waveform calculation unit 81 may calculate the frequency amplitude Δf instead of or in addition to the frequency change ratio μ. When the frequency amplitude Δf is calculated, Equation (2) described above may be used. On the other hand, when the frequency change ratio μ is specified by the user, the waveform calculation unit 81 calculates a pulse length $T_0$. In this case, the waveform calculation unit 81 may calculate the frequency amplitude Δf instead of or in addition to the pulse length $T_0$. The waveform determination unit 82 then determines the pulse length $T_0$, the frequency change ratio μ, and the frequency amplitude Δf as a transmission waveform.

In other words, first, at the input device 11, a value of a desired process gain PG is specified by the user, and one value of the pulse length $T_0$, the frequency change ratio μ, and the frequency amplitude Δf of a signal wave is further specified by the user. The input device 11 inputs these values to the waveform calculation unit 81. The waveform calculation unit 81 then uses the input values to calculate the remaining value(s), which has not been specified, of the pulse length $T_0$, the frequency change ratio μ, and the frequency amplitude Δf. Note that the waveform calculation unit 81 can calculate at least one of the two values that have not been specified of the pulse length $T_0$, the frequency change ratio μ, and the frequency amplitude Δf.

Next, the transmission signal generator 13 generates a transmission signal of the determined waveform (step S104). For example, the transmission signal generator 13 generates an LFM signal in which the center frequency is 1000 [Hz], the pulse length $T_0$ is 0.1 (s), the frequency change ratio μ is 1000 (Hz/s), and the frequency amplitude Δf is 100 (Hz). The transmission signal amplifier 14 amplifies the power of the LFM signal. The transmitter 15 converts the LFM signal to a signal wave such as an acoustic wave, a radio wave, or the like and transmits it as a transmission wave (step S105).

The transmitted signal wave is reflected by the target 100 and objects other than the target 100 (sea surface, ground, or the like). The receiver 16 receives these reflected waves and converts the acoustic wave, the radio wave, or the like to an electric signal (step S106). The received signal amplifier 17 amplifies the power of the received signal, and the bandpass filter 18 filters a frequency band including the reflected wave from the target 100. The A/D converter 19 samples the received signal and converts it to a digital signal that can be processed by the signal processing device 20 (step S107).

Next, the signal processing device 20 performs a replica correlation process (step S108). That is, the signal processing device 20 uses the Fourier transform unit 91, the Fourier transform unit 93, the multiplier unit 94, and the inverse Fourier transform unit 95 to calculate the correlation degree between the replica signal generated by the replica signal generation unit and the received signal. The signal processing device 20 then detects the presence or absence of the target based on the peak p of the correlation degree (step S109). For example, the target detection unit 96 determines that the target 100 is present when the peak p of the correlation degree is greater than a predetermined threshold. The target detection unit 96 then calculates the position of the target 100 based on the time to when the peak p of the correlation degree is measured and displays a process result on the display device 21.

According to the present example embodiment, a transmission waveform which satisfies a process gain specified by the user can be determined based on the relational equation for the process gain. Therefore, a transmission waveform which would otherwise be determined experimentally or empirically can be determined in a quantitative manner, which can sufficiently exhibit the performance of a search system.

Conventionally, trial and error has been made to try to set a pulse length and a frequency change ratio of a transmission wave in order to obtain a desired process gain. In the actual practice, however, there are many discrepant constraint conditions for a transmission waveform. For example, there are limits in the pulse length and the frequency change ratio that the signal generator can output, and there are further limits in the sensitivity and the bandwidth of the transceiver.

For example, when the pulse length of a transmission wave is increased, the electric load on a transmission signal amplifier increases, which may cause a problem of heat generation or the like. Further, since the half a pulse length is a distance resolution, a longer pulse length may degenerate the distance resolution. A longer pulse length results in a longer reception period of a reflected wave and thus causes a longer period during which no transmission wave can be transmitted (blind period). In addition, a longer pulse length may cause a disadvantage that an accidental noise is likely to be mixed in a signal.

Further, an excessively larger frequency change ratio may cause the following problems. That is, the operation frequency may be shifted from the resonance frequency and the Q-value of an piezoelectric ceramics of the transceiver, and a desired gain may be no longer obtained. A sudden frequency change may cause a high-frequency noise. Further, in a replica correlation process, since frequency domain components (bins) handled in Fourier transform increase, this may cause a problem of a high computing capability being demanded to a calculation resource.

According to the present example embodiment, an optimal transmission waveform can be easily determined for obtaining a desired process gain even under the various constraints of a circuit and signal processing. Further, since a searchable distance of the search system is easily projected from a specified process gain, the arrangement of the transmitter and the receiver of the search system can be appropriately determined.

Second Example Embodiment

Subsequently, a target search system according to a second example embodiment of the present invention will be described. Since the target search system according to the present example embodiment is configured in a similar manner to the target search system according to the first example embodiment, features different from those of the first example embodiment will be mainly described.

Figure 5:
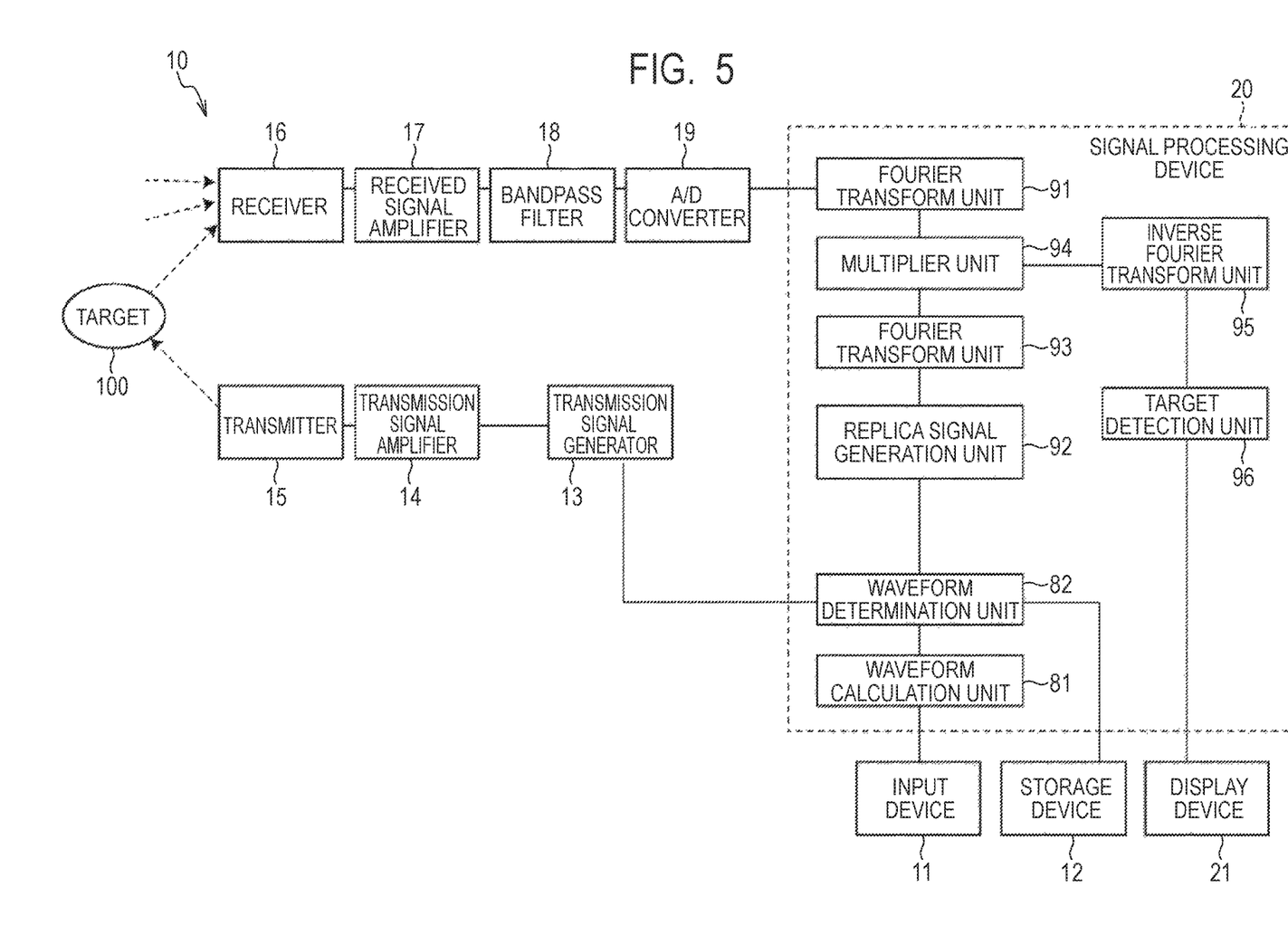
FIG. 5 is a block diagram illustrating a configuration of a target search system according to a second example embodiment of the present invention.

FIG. 5 is a block diagram illustrating a configuration of the target search system 10 according to the present example embodiment. The target search system 10 has a storage device 12 in addition to the input device 11, the transmission signal generator 13, the transmission signal amplifier 14, the transmitter 15, the receiver 16, the received signal amplifier 17, the bandpass filter 18, the analog-to-digital (A/D) converter 19, the signal processing device 20, and the display device 21.

The storage device 12 is, for example, a storage device such as a flash memory, a hard disk drive, or the like or a portable storage medium such as an optical disk, a memory card, or the like. In the storage device 12, combinations of the pulse length $T_0$, the frequency change ratio $\mu$, and the frequency amplitude $\Delta f$ that can be transmitted in the target search system 10 are pre-stored. For example, these combinations correspond to transmission waveforms that can be generated by the transmission signal generator 13 and are set by taking into consideration of various constraints such as the sensitivity and the bandwidth of the transmitter 15 and the receiver 16, the computing capability of the signal processing device 20, an electrical load on each circuit of the target search system 10. In the storage device 12, a criterion for selecting a combination, a process result of target detection, or the like is further stored.

The waveform determination unit 82 can select one appropriate combination out of a plurality of combinations stored in the storage device 12 and output the selected combination to the transmission signal generator 13. In this case, a criterion for selecting a combination is predefined and pre-stored in the storage device 12 or the like. This selection criterion can be specified by the user in the input device 11.

For example, as one selection criterion, the waveform determination unit 82 selects a combination having the smallest sum of squares of the respective differences between the pulse length $T_0$ and the frequency change ratio $\mu$ input from the waveform calculation unit 81 and the pulse length $T_0$ and the frequency change ratio $\mu$ stored in the storage device 12. The combination on which a sum of squares of the differences is calculated may be the pulse length $T_0$ and the frequency amplitude $\Delta f$ or may be the frequency change ratio $\mu$ and the frequency amplitude $\Delta f$.

Further, as another selection criterion, when the pulse $T_0$ is specified by the user, for example, the waveform determination unit 82 selects a combination having the largest process gain PG calculated by Equation (1) out of combinations including the specified pulse length $T_0$. Similarly, when the frequency change ratio $\mu$ or the frequency amplitude $\Delta f$ is specified, the waveform determination unit 82 selects a combination having the largest process gain PG calculated by Equation (1) out of combinations including the specified frequency change ratio $\mu$ or frequency amplitude $\Delta f$.

Figure 6:
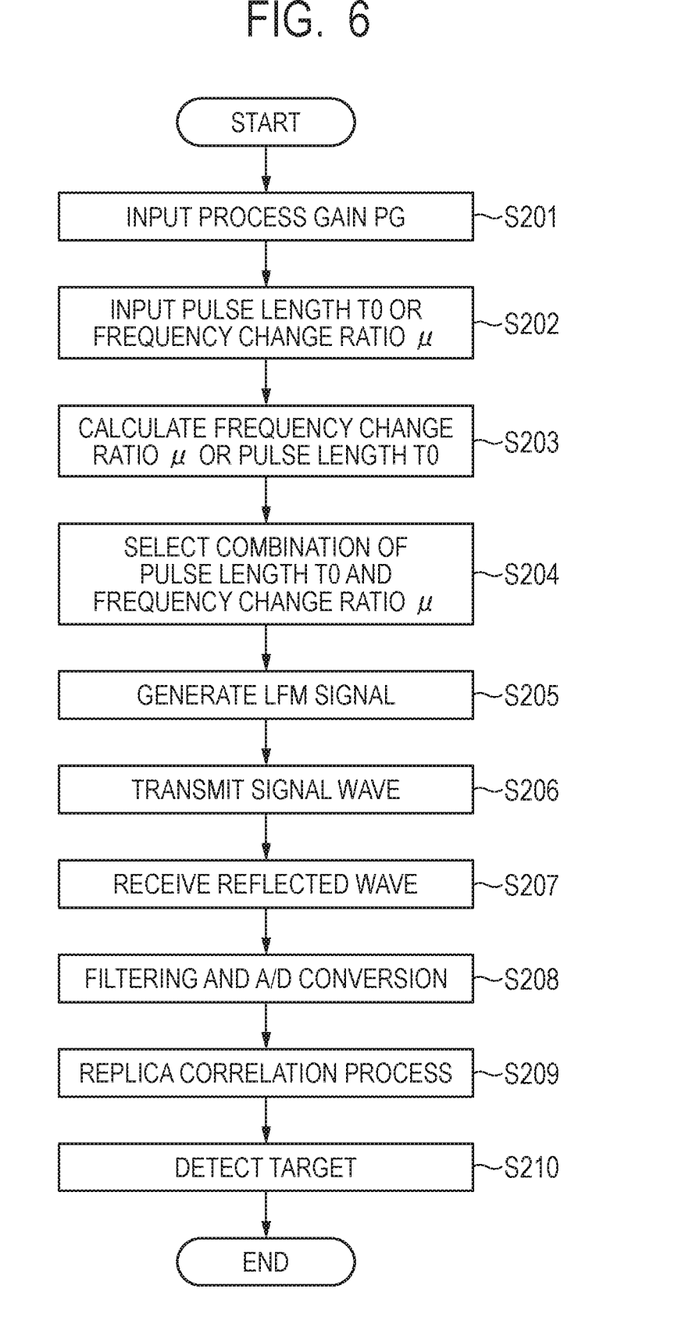
FIG. 6 is a flowchart illustrating a process of a target search system according to the second example embodiment of the present invention.

FIG. 6 is a flowchart illustrating a process of a target search system 10 according to the present example embodiment. First, the input device 11 inputs a process gain PG specified by the user to the waveform calculation unit 81 (step S201). Furthermore, the input device 11 acquires a value of a pulse length $T_0$ or a frequency change ratio $\mu$ from the user. Specifically, the input device 11 inputs a pulse length $T_0$ or a frequency change ratio $\mu$ specified by the user to the waveform calculation unit 81 (step S202). The process order of these steps S201 and S202 may be opposite.

Next, the waveform calculation unit 81 and the waveform determination unit 82 determine a transmission waveform based on user designation. Specifically, first, the waveform calculation unit 81 calculates the remaining value(s), which has not been specified, of the pulse length $T_0$ or the frequency change ratio $\mu$ so as to satisfy Equation (1) described above (step S203). That is, the waveform calculation unit 81 calculates the frequency change ratio $\mu$ when the pulse length $T_0$ is specified by the user. In this case, the waveform calculation unit 81 may calculate the frequency amplitude $\Delta f$ instead of or in addition to the frequency change ratio $\mu$. When the frequency amplitude $\Delta f$ is calculated, Equation (2) described above may be used. On the other hand, when the frequency change ratio $\mu$ is specified by the user, the waveform calculation unit 81 calculates a pulse length $T_0$. In this case, the waveform calculation unit 81 may calculate the frequency amplitude $\Delta f$ instead of or in addition to the pulse length $T_0$.

Subsequently, the waveform determination unit 82 selects a combination of the pulse length $T_0$ and the frequency change ratio $\mu$ out of a predetermined combination stored in the storage device 12 (step S204). Specifically, the waveform determination unit 82 searches the storage device 12 for the combination of the pulse length $T_0$, the frequency change ratio $\mu$, and the frequency amplitude $\Delta f$ input from the waveform calculation unit 81. When such a combination is not present in the storage device 12, the waveform determination unit 82 then selects an appropriate combination based on a selection criterion and determines it as a transmission waveform. The waveform determination unit 82 performs a similar process even when the combination input from the waveform calculation unit 81 is any combination of the pulse length $T_0$ and the frequency change ratio $\mu$, the pulse length $T_0$ and the frequency amplitude $\Delta f$, or the frequency change ratio $\mu$ and the frequency amplitude $\Delta f$. Since the subsequent steps S205 to S210 are the same as steps S104 to S109 of FIG. 4, the description thereof is omitted.

According to the present example embodiment, even when the combination of the pulse length $T_0$, the frequency change ratio $\mu$, and the frequency amplitude $\Delta f$ specified in the input device 11 and calculated by the waveform calculation unit 81 is a waveform that cannot be transmitted in the actual implementation, a waveform which is similar to the combination and can be transmitted can be selected. Further, in selecting transmission waveform, a transmission waveform by which the optimal process gain can be obtained can be selected.

Other Example Embodiments

Figure 7:
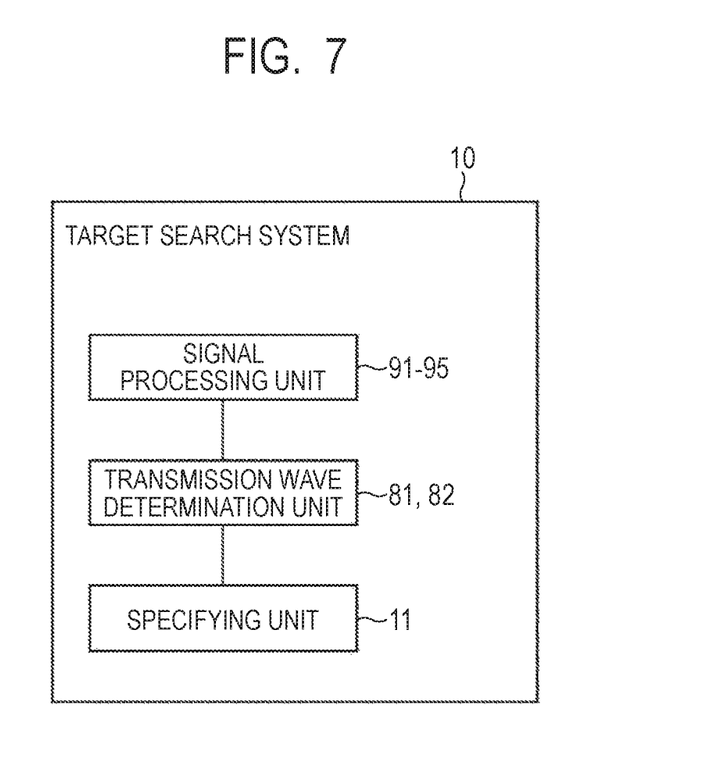
FIG. 7 is a schematic configuration diagram of the target search system according to each example embodiment of the present invention.

FIG. 7 is a schematic configuration diagram of the target search system 10 according to each example embodiment described above. FIG. 7 illustrates a configuration example for implementing a function that can obtain a desired process gain when there is influence of a reflected wave from an object other than the target. The target search system 10 has a signal processing unit 91 to 95 that is input with a received signal including a reflected wave based on a pulsed transmission wave modulated in linear frequency modulation, calculates mutual correlation between the transmission wave and the received signal, and amplifies a power ratio of a signal component of a reflected wave from a target and another signal component at a predetermined process gain; a specifying unit 11 by which a user specifies one value of a pulse length, a frequency change ratio, and a frequency amplitude of the transmission wave and the process gain; and a transmission wave determination unit 81 and that determines a remaining value of the transmission wave based on the specified one value of the pulse length, the frequency change ratio, and the frequency amplitude and the specified process gain so as to satisfy

[Math. 44]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude of the transmission wave is denoted as $\Delta f = T_0 \times \mu$ (Hz).

The present invention is not limited to the example embodiments described above and can be changed as appropriate without departing from the spirit of the present invention. For example, while the input device in the example embodiments described above is configured such that the user specifies a process gain, it may be configured such that the user specifies a search area on which target search is performed. For example, a desired process gain value is predefined in association with the distance to the search area, and thereby a process gain value can be read in accordance with designation of a search area. A desired process gain value can be predefined based on a transmission wave level of a transmitter, a propagation loss, a gain of a receiver, or the like.

Further, the scope of each of the example embodiments includes a processing method that stores, in a storage medium, a program causing the configuration of each of the example embodiments to operate so as to realize the function of each of the example embodiments described above (more specifically, a program causing a computer to perform the method illustrated in FIG. 4 or FIG. 6), reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A target search system comprising:

a signal processing unit that is input with a received signal including a reflected wave based on a pulsed transmission wave modulated in linear frequency modulation, calculates mutual correlation between the transmission wave and the received signal, and amplifies a power ratio of a signal component of a reflected wave from a target and another signal component at a predetermined process gain;

a specifying unit by which a user specifies one value of a pulse length, a frequency change ratio, and a frequency amplitude of the transmission wave and the process gain; and a transmission wave determination unit that determines a remaining value of the transmission wave based on the specified one value of the pulse length, the frequency change ratio, and the frequency amplitude of the transmission wave and the specified process gain so as to satisfy

[Math. 45]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

(Supplementary Note 2)

The target search system according to supplementary note 1 further comprising a storage unit that pre-stores combinations of a pulse length, a frequency change ratio, and a frequency amplitude of the transmission wave, wherein, when the determined combination of a pulse length, a frequency change ratio, and a frequency amplitude of the transmission wave is not stored in the storage unit, the transmission wave determination unit selects a pulse length, a frequency change ratio, and a frequency amplitude of the transmission wave from the combination stored in the storage unit.

(Supplementary Note 3)

The target search system according to supplementary note 1 or 2 further comprising:

a transmission unit that transmits a transmission wave having the determined pulse length, frequency change ratio, and frequency amplitude; and a receiving unit that receives a received signal including a reflected wave based on the transmission wave, wherein the signal processing unit detects the target based on a value of the mutual correlation.

(Supplementary Note 4)

A target search method comprising steps of:

inputting a received signal including a reflected wave based on a pulsed transmission wave modulated in linear frequency modulation;

calculating mutual correlation between the transmission wave and the received signal and amplifying a power ratio of a signal component of a reflected wave from a target and another signal component at a predetermined process gain;

acquiring one value of a pulse length, a frequency change ratio, and a frequency amplitude of the transmission wave and the process gain from a user; and determining a remaining value of the transmission wave based on the specified one value of the pulse length, the frequency change ratio, and the frequency amplitude of the transmission wave and the specified process gain so as to satisfy

[Math. 46]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

(Supplementary Note 5)

A target search program that causes a computer to execute steps of:

inputting a received signal including a reflected wave based on a pulsed transmission wave modulated in linear frequency modulation;

calculating mutual correlation between the transmission wave and the received signal and amplifying a power ratio of a signal component of a reflected wave from a target and another signal component at a predetermined process gain;

acquiring one value of a pulse length, a frequency change ratio, and a frequency amplitude of the transmission wave and the process gain from a user; and determining a remaining value of the transmission wave based on the specified one value of the pulse length, the frequency change ratio, and the frequency amplitude of the transmission wave and the specified process gain so as to satisfy

[Math. 47]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

While the present invention has been described with reference to the example embodiments, the present invention is not limited to the example embodiment described above. Various modification that can be understood by those skilled in the art can be made to the configuration or the details of the present invention.

This application is based upon and claims the benefit of priority from Japanese Patent Application No. 2016-059624, filed on Mar. 24, 2016, the disclosure of which is incorporated herein in its entirety by reference.

REFERENCE SIGNS LIST

10 target search system
11 input device (specifying unit)
12 storage device
13 transmission signal generator
14 transmission signal amplifier
15 transmitter
16 receiver
17 received signal amplifier
18 bandpass filter
19 A/D converter
20 signal processing device
21 display device
81 waveform calculation unit (transmission wave determination unit)

82 waveform determination unit (transmission wave determination unit)
91 Fourier transform unit (signal processing unit)
92 replica signal generation unit (signal processing unit)
93 Fourier transform unit (signal processing unit)
94 multiplier unit (signal processing unit)
95 inverse Fourier transform unit (signal processing unit)
96 target detection unit
100 target

What is claimed is:

1. A target search system comprising:
a signal processing unit that is input with a received signal including a reflected wave based on a pulsed transmission wave modulated in linear frequency modulation, calculates mutual correlation between the transmission wave and the received signal, and amplifies a power ratio of a signal component of a reflected wave from a target and another signal component at a predetermined process gain;
a specifying unit by which a user specifies one value of a pulse length, a frequency change ratio, and a frequency amplitude of the transmission wave and the process gain; and
a transmission wave determination unit that determines a remaining value of the transmission wave based on the specified one value of the pulse length, the frequency change ratio, and the frequency amplitude of the transmission wave and the specified process gain so as to satisfy

[Math. 1]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

2. The target search system according to claim 1 further comprising a storage unit that pre-stores combinations of a pulse length, a frequency change ratio, and a frequency amplitude of the transmission wave,
wherein, when the determined combination of a pulse length, a frequency change ratio, and a frequency amplitude of the transmission wave is not stored in the storage unit, the transmission wave determination unit selects a pulse length, a frequency change ratio, and a frequency amplitude of the transmission wave from the combination stored in the storage unit.

3. The target search system according to claim 1 further comprising:
a transmission unit that transmits a transmission wave having the determined pulse length, frequency change ratio, and frequency amplitude; and
a receiving unit that receives a received signal including a reflected wave based on the transmission wave,
wherein the signal processing unit detects the target based on a value of the mutual correlation.

4. A target search method comprising:
inputting a received signal including a reflected wave based on a pulsed transmission wave modulated in linear frequency modulation;
calculating mutual correlation between the transmission wave and the received signal and amplifying a power ratio of a signal component of a reflected wave from a target and another signal component at a predetermined process gain;
acquiring one value of a pulse length, a frequency change ratio, and a frequency amplitude of the transmission wave and the process gain from a user; and
determining a remaining value of the transmission wave based on the specified one value of the pulse length, the frequency change ratio, and the frequency amplitude of the transmission wave and the specified process gain so as to satisfy

[Math. 2]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

5. A non-transitory storage medium in which a target search program is stored, the program that causes a computer to execute:
inputting a received signal including a reflected wave based on a pulsed transmission wave modulated in linear frequency modulation;
calculating mutual correlation between the transmission wave and the received signal and amplifying a power ratio of a signal component of a reflected wave from a target and another signal component at a predetermined process gain;
acquiring one value of a pulse length, a frequency change ratio, and a frequency amplitude of the transmission wave and the process gain from a user; and
determining a remaining value of the transmission wave based on the specified one value of the pulse length, the frequency change ratio, and the frequency amplitude of the transmission wave and the specified process gain so as to satisfy

[Math. 3]

$$PG = T_0 \sqrt{\frac{|\mu|}{2\pi}}$$

where the process gain is denoted as PG, the pulse length is denoted as $T_0$ (second), the frequency change ratio is denoted as $\mu$ (Hz/second), and the frequency amplitude is denoted as $\Delta f = T_0 \times \mu$ (Hz).

* * * * *